United States Patent
Suzuki et al.

(10) Patent No.: US 7,716,346 B2
(45) Date of Patent: May 11, 2010

(54) COMMUNICATION PARAMETER SETTING METHOD, SETTING SERVER, AND SETTING PROGRAM

(75) Inventors: Tatsu Suzuki, Kawasaki (JP); Tomonori Kaizuka, Kawasaki (JP); Naoko Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1450 days.

(21) Appl. No.: 11/052,136

(22) Filed: Feb. 8, 2005

(65) Prior Publication Data

US 2005/0138107 A1 Jun. 23, 2005

Related U.S. Application Data

(63) Continuation of application No. PCT/JP03/01231, filed on Feb. 6, 2003.

(51) Int. Cl.
*G06F 15/16* (2006.01)
(52) U.S. Cl. .................. 709/228; 709/220; 709/223; 709/227; 370/252
(58) Field of Classification Search .............. 709/227, 709/228, 220, 223; 370/252, 464, 465
See application file for complete search history.

(56) References Cited

U.S. PATENT DOCUMENTS

| | | | | |
|---|---|---|---|---|
| 6,374,288 | B1 * | 4/2002 | Bhagavath et al. | 709/223 |
| 6,832,255 | B1 * | 12/2004 | Rumsewicz et al. | 709/227 |
| 6,967,996 | B1 * | 11/2005 | Cai et al. | 375/222 |
| 7,093,289 | B2 * | 8/2006 | McElroy et al. | 726/13 |
| 7,499,408 | B1 * | 3/2009 | Black | 370/252 |
| 2002/0198609 | A1 * | 12/2002 | Baron | 700/48 |
| 2004/0059801 | A1 * | 3/2004 | Nakanishi et al. | 709/220 |

OTHER PUBLICATIONS

Japanese Abstract 11-338805 A dated Dec. 1999.
Japanese Abstract 2001-051924 A dated Feb. 2001.
Japanese Abstract 11-073399 A dated Mar. 1999.

* cited by examiner

*Primary Examiner*—Ramy M Osman
(74) *Attorney, Agent, or Firm*—Staas & Halsey LLP

(57) ABSTRACT

A setting server connected to a network for use in communication service outputs, to a user terminal provided on a user side, an interface on-screen image for inputting the communication parameters. The setting server accepts an input of user communication parameters from the interface on-screen image. The setting server connects to a communication apparatus on the side of a service provider that provides the communication service. Further, the setting server sets the user communication parameters to the communication apparatus.

24 Claims, 10 Drawing Sheets

FIG. 5

| | DSLAM SETTING PARAMETER | | | MODEM SETTING PARAMETER | | | PC SETTING PARAMETER | | |
|---|---|---|---|---|---|---|---|---|---|
| | PARAMETER 1 (EXAMPLE: NOISE MARGIN) | PARAMETER 2 | --PARAMETER n1 | PARAMETER 1 (EXAMPLE: ADSL TRANSMISSION SYSTEM) | PARAMETER 2 | --PARAMETER n2 | PARAMETER 1 (EXAMPLE: TCP/IP WINDOW SIZE) | PARAMETER 2 | --PARAMETER n3 |
| SETTING PATTERN 1 | | | | | | | | | |
| SETTING PATTERN 2 | | | | | | | | | |
| SETTING PATTERN m | | | | | | | | | |

COMMUNICATION PARAMETER SETTING METHOD, SETTING SERVER, AND SETTING PROGRAM

This is a continuation of Application PCT/JP2003/001231, filed on Feb. 6, 2003.

BACKGROUND OF THE INVENTION

The present invention relates to a communication parameters setting technique in a communication service where it is required to set, for each user, communication parameters corresponding to quality condition, and use of a line.

In xDSL (Digital Subscriber Line) service, the quality of a line is influenced by a distance between each end user and a station (hereinafter referred to as an "accommodation station") that accommodates a DSLAM (Digital Subscriber Line Access Multiplexer) or an amount of noise due to radio waves therebetween. Also, in the xDSL service described above, speeding-up of the effective speed of the line and stabilization of the quality of the line are in correlation with each other. That is, in the xDSL service, an increase of the line effective speed lowers the line quality and an improvement of the line quality reduces the line effective speed. Here, the demands of the end user on the line varies in various ways depending on use of application which the end user uses. Accordingly, in order to provide each end user with an optimum line quality, it is required to set communication parameters for each end user on a DSLAM side in great detail.

In the communication parameters setting described above, when large noise occurs on the used communication line, it is required to stabilize the line quality. In order to stabilize the line quality, when a fluctuation amount of the noise between the end user and the accommodation station is large, for instance, a noise margin value that is a DSLAM communication parameter is increased. Also, the line of which the noise fluctuation amount is small (the line of which quality is stabilized) sets, the communication parameters performed so that the noise margin value is decreased and the line speed is increased.

However, a fluctuation width of the noise varies depending on the used line. In addition, the noise fluctuation width also varies depending on time zone. Therefore, it is not easy for a communication service provider to set optimum communication parameters for each end user.

Therefore, the conventional communication parameters setting is performed through the following procedure. First, the communication service provider sets the uniform communication parameters for every end user when the line is put into service. Following this, on receiving a complaint from the end user about the line quality, an expert, such as an operator, at the communication service provider changes the communication parameters setting for the end user.

Aside from this, there is also a case where a line log of each end user within a specified passing time from the start of service is checked, and a setting change is automatically made to the line to which a line disconnection frequently occurs.

As described above, in the conventional communication service, at the time of start of service, a line is provided for the end user under a uniform setting. Therefore, communication parameters corresponding to each line are not set, so it is hard to say that favorable line quality is necessarily provided to every end user (see (1) in FIG. 10). In this case, the end user makes a complaint to a contact center (client service center) of the communication service provider using means such as a telephone (see (2) in FIG. 10) and so on. Then, in accordance with the complaint from the end user, the operator (expert) at the communication service provider manually makes a change to the communication parameters setting of the line that the end user uses.

Also, even when the change of the communication parameters setting is made in accordance with the complaint from the end user in this manner, the setting is not necessarily an optimum setting for the end user. Accordingly, there is a case where the end user makes a complaint to the communication service provider repeatedly before he/she obtains an optimum communication parameters setting. In addition, there is also a case where even when the end user temporarily obtains an optimum setting through the communication parameters setting change, the optimum communication parameters setting varies due to an environmental change in the region of the end user. An example of the environmental change of the line described above includes a change in installation situation of a peripheral ISDN line. Accordingly, it is not easy for each end user to always obtain an optimum setting at the time of use of the xDSL service. Also, this incurs lowering of the level of end user satisfaction with the xDSL service (see (3) in FIG. 10). Further, at the communication service provider, manpower is required to address client complaints, which incurs an increase in cost such as labor cost (see (4) in FIG. 10) and so on.

Also, in the case where the line log of each end user within a specified passing time from the start of service is checked, and a setting change is automatically made to each line to which a line disconnection frequently occurs, a considerable time is taken from recognition of a problem by the end user to the setting change. Also, in such a case, the problem of the communication parameters is found with reference to the line log, so there is no case of setting appropriate communication parameters for each user.

Further, in the case of rate of deterioration in the line quality in a certain period of around several days, there occurs a problem in that the line speed is reduced more than necessary in order to enhance the line quality.

It should be noted here that as an example of conventional and general service where a user request with respect to the communication service is accepted at the communication service provider, there is service where an application for a change of the contents of a contract to use the communication service is accepted on a Web site (see "NIPPON TELEGRAPH AND TELEPHONE EAST CORPORATION, "FLET'S ADSL change application" (online), NIPPON TELEGRAPH AND TELEPHONE EAST CORPORATION, (search was conducted on Dec. 20, 2002) Internet URL:http://www.ntt-east.co.jp/cgi-bin/flets/alter/adsl/adrnwl1.cgi", for instance).

SUMMARY OF THE INVENTION

Conventionally, however, no technique for setting communication parameters corresponding to each line has been provided.

The present invention has been made in light of the conventional technical problems. That is, an object of the present invention is to provide a line setting technique with which it is possible to obtain a line state required by an end user without placing a load on a communication service provider.

In order to attain the object described above, the present invention adopts the following means. That is, the present invention supports a setting of communication parameters of a user in a communication service. A setting server connected to a network for use in the communication service outputs, to a user terminal provided on a user side, an interface screen for inputting the communication parameter. Also, the setting server accepts an input of user communication parameters with the interface screen. Further, the setting server connects to a communication apparatus on the side of a service provider that provides the communication service. Still further, the setting server sets the user communication parameters to the communication apparatus.

According to the present invention, a user who uses the communication service sets communication parameters that he/she requires, enabling communication quality or a line speed that he/she requires.

Also, in the present invention, the setting server may connect to a control apparatus that controls the communication apparatus. The setting server may set the user communication parameters to the communication apparatus via the control apparatus.

According to the present invention, even when the control apparatus that controls the communication apparatus that provides the communication service exists on a communication service provider side, it becomes possible to set the communication parameters required by the user via the control apparatus.

Also, in the present invention, the setting server accepts a connection request with respect to the control apparatus from the user terminal. Also, the setting server authenticates the user terminal in response to the connection request.

According to the present invention, when the user who uses the communication service makes a request to set the parameters, it is confirmed that a person who attempts to perform the communication parameters setting is the user himself/herself. As a result, it becomes possible to prevent a situation where another person performs the communication parameters setting without authority.

Also, in the present invention, the setting server displays current set communication parameters on the interface screen.

According to the present invention, at the time of the communication parameters setting, it becomes possible for the user to set new communication parameters while referring to the current set communication parameters.

Also, in the present invention, the setting server displays communication log information at the time of provision of the communication service using the current set communication parameters.

According to the present invention, it is possible for the user to know a communication condition at the time of the provision of the communication service from the communication log information, so it becomes possible for him/her to perform the new communication parameters setting with reference to the communication log information.

Further, in the present invention, the setting server displays a setting change history of communication parameters set by the user in the past.

According to the present invention, at the time of the communication parameters setting, it becomes possible for the user to refer to the communication parameters set in the past.

Also, in the present invention, the communication parameters may be set using a batch setting identifier combining plural set values.

According to the present invention, by creating a set of communication parameters of plural setting items using batch setting identifiers, it becomes possible to simplify the communication parameters setting.

Also, in the present invention, when the communication parameters setting is performed, a timer for time measurement may be started and, when no setting confirmation response is accepted with respect to the communication parameters setting from the user terminal within a measurement time period determined in advance, communication parameters that allow communication to be set.

According to the present invention, when the end user changes the communication parameters of a line that he/she uses under a contract, communication parameters set by setting means are automatically returned to a state before the change after the prescribed time period has elapsed. As a result, it becomes possible to avoid a situation where the line falls into an incommunicable state due to the erroneous communication parameters setting of the end user.

BRIEF DESCRIPTION OF THE DRAWINGS

FIG. 5 shows an example of a set value pattern table in this system;

DESCRIPTION OF THE PREFERRED EMBODIMENTS

Hereinafter, an embodiment of a communication parameters setting method according to the present invention will be described with reference to FIG. 1 to FIG. 10.

<<Overall Configuration of this Embodiment>>

The outline of a communication parameters setting method according to this embodiment will be described. In this system, an operation for setting communication parameters, out of communication parameters that need to be set to an in-station apparatus (communication apparatus on a service provider side) of a communication service provider that provides communication service, which should be individually set for each end user who uses a line is opened to the end user. Consequently, in this system, it is possible for the end user directly to change the parameters of the line, which he/she uses under a contract, to an optimum state by himself/herself.

Figure 1:
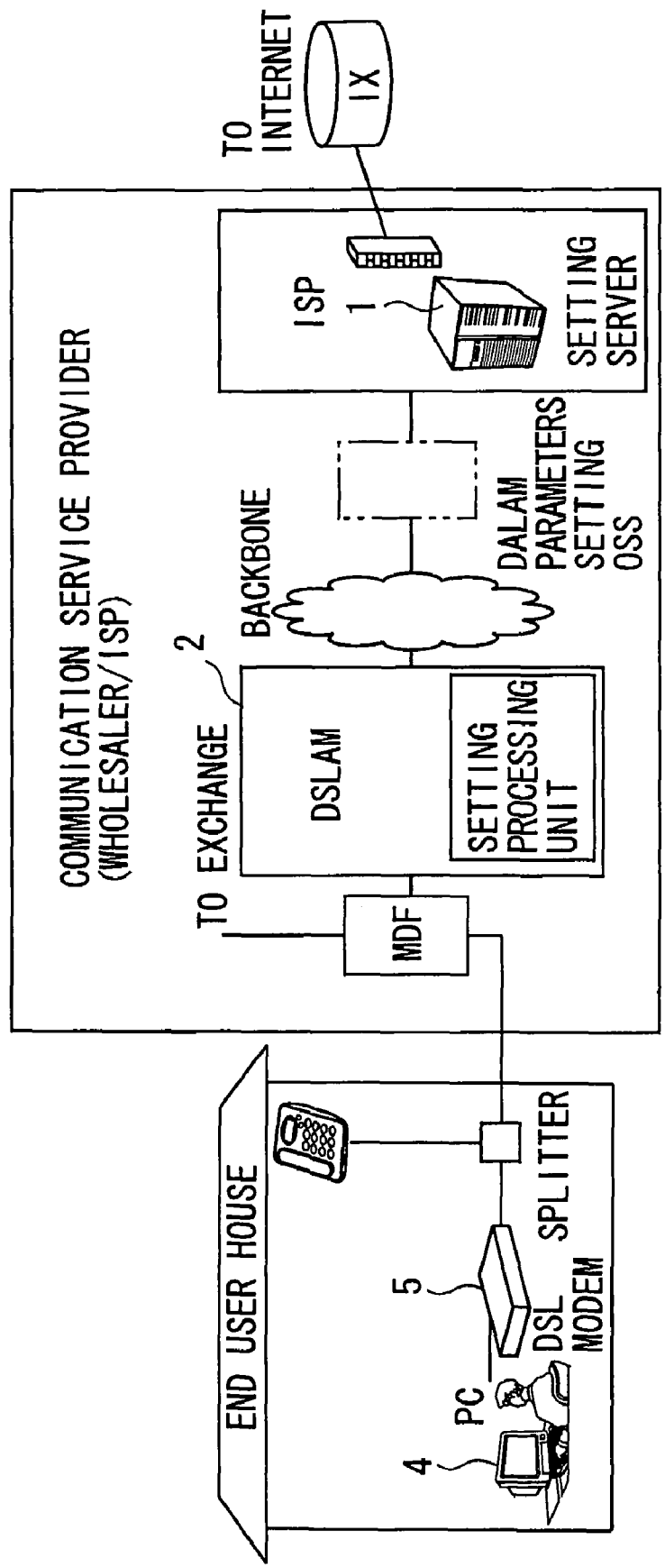
FIG. 1 is an overall configuration diagram of a system where a communication parameters setting method according to an embodiment of the present invention is implemented.

FIG. 1 shows an overall configuration of an information system that realizes the communication parameters setting method according to the present invention. First, in this system, the communication service provider installs a setting server 1 connected to a network for use in the communication service.

The setting server 1 connects to a user terminal 4 via an MDF (Main Distributing Frame) 6 from a communication apparatus 5, such as an xDSL modem and so on, on a user side. Also, the setting server 1 connects to a communication apparatus 2, such as a DSLAM and so on, on a service provider side via a backbone (backbone network on a communication service provider side).

The setting server 1 includes interface screen output means for outputting an interface screen for inputting communication parameters to the user terminal 4 of an end user via a public network, such as the Internet and so on, or a network of the communication service provider. Also, the setting server 1 includes input means for accepting an input of communication parameters from the user terminal 4. It is possible for the end user to log in the setting server 1 after authentication by inputted an authentication code, such as a client ID and so on, into the setting server 1. Further, the setting server 1 includes connection means for connecting to the communication apparatus 2, such as a DSLAM (Digital Subscriber Line Access Multiplexer) and so on, on the service provider side. Alternatively, the connection means establishes connection to a control apparatus 3 on which an operation system (DSLAM parameters setting operation system) that is capable of changing a setting of communication parameters of the DSLAM 2 has been installed. In addition, this system includes setting means that is capable of changing a setting of line setting parameters of the DSLAM 2 or the control apparatus 3 from the setting server 1. With these means, in this system, it is possible for the end user to change communication parameters on the communication apparatus 2 side.

<<Functional Configuration of this Embodiment>>

Figure 2:
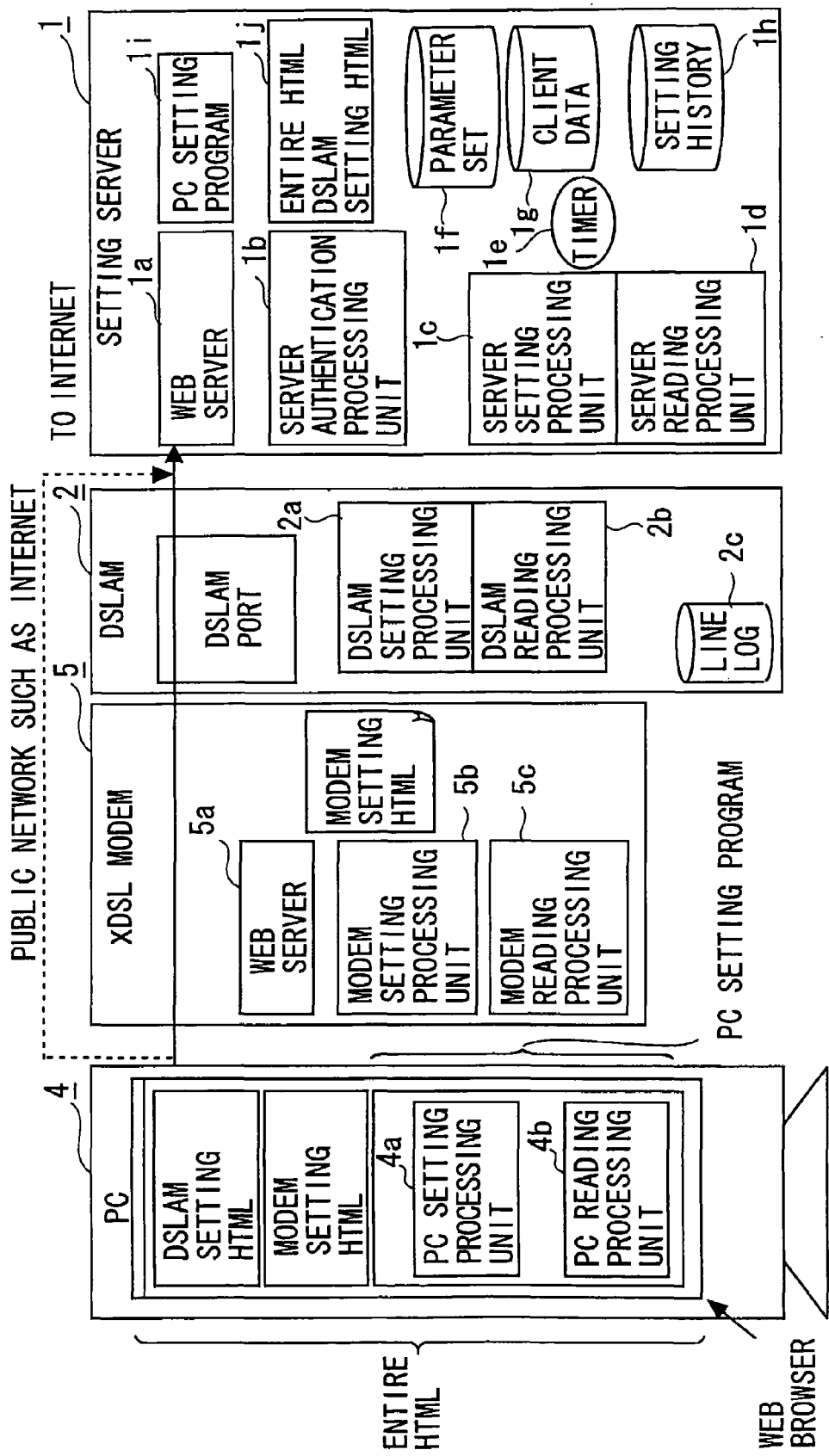
FIG. 2 is a functional configuration diagram of this system.

FIG. 2 is a functional configuration diagram of the embodiment of the present invention.

In this embodiment, the setting server 1 is installed. The setting server 1 includes a Web server unit (an input unit, an interface screen output unit, and a request accepting unit of the present invention) 1a. The Web server unit 1a causes a setting interface screen for inputting data, which is necessary when the end user sets communication parameters from the user terminal 4, to be displayed on the user terminal 4. Also, the setting server 1 includes a server authentication processing unit (an authentication unit and an interface screen output unit of the present invention) 1b for authenticating the user terminal 4 and reading user information concerning the user terminal 4. Further, the setting server 1 includes a server setting processing unit (a connection unit, an interface screen output unit, and a setting unit of the present invention) 1c. The server setting processing unit 1c performs a setting of communication parameters to the communication apparatus 2. Also, the server setting processing unit 1c performs timer timeout monitoring for setting confirmation using a timer 1e. Further, the server setting processing unit 1c sets communication parameters to the DSLAM 2 by referring to setting history information. Also, the setting server 1 includes a server reading processing unit (a setting unit and an interface screen output unit of the present invention) 1d. The server reading processing unit 1d reads a current communication parameters setting state of the communication apparatus 2. Also, the server reading processing unit 1d reads a current line log of the communication apparatus 2. Further, the server reading processing unit 1d reads setting history data from a setting history database 1h. Also, the setting server 1 includes various databases described below. The setting server 1 includes a client database 1g that is necessary for authentication processing. The setting server 1 includes the setting history database 1h that stores setting history data. The setting server 1 includes a parameter set database 1f that stores parameter sets which sets of numerical values of plural communication parameters. The setting server 1 includes an entire HTML (Hyper Text Markup Language) database 1j for reading communication parameters from the user terminal 4 by the setting server 1. The setting server 1 includes a DSLAM setting HTML database 1j. In addition, the setting server 1 stores a PC setting program 1i and the like for making a change to a setting of the user terminal 4.

The communication apparatus 2 includes a DSLAM setting processing unit 2a that makes a setting of a DSLAM port when accepting a setting request from the setting server 1. Also, the communication apparatus 2 includes a DSLAM reading processing unit 2b that reads a line log from a line log database 2c at the time of reading communication parameters. Further, the DSLAM 2 includes the line log database 2c that stores line logs. It should be noted here that in the following description of this embodiment, a DSLAM is used as an example of the communication apparatus 2 on the service provider side.

The user-side communication apparatus 5, such as an xDSL modem and so on, installed on the user side includes a Web server unit 5a for reading data displayed on the setting screen by the end user. Also, the user-side communication apparatus 5 includes a modem setting processing unit 5b that performs setting processing in accordance with a setting request when requesting the setting with respect to the user-side communication apparatus 5 from the user terminal 4. Further, the user-side communication apparatus 5 includes a modem reading processing unit 5c that performs processing for reading communication parameters when requesting to read the communication parameters of the user-side communication apparatus 5 in accordance with a communication parameter read request from the user terminal 4. In addition, in the user-side communication apparatus 5, a modem setting HTML for reading by the Web server 5a is stored. It should be noted here that in the following description of this embodiment, an xDSL modem is used as an example of the user-side communication apparatus 5.

The user terminal 4, such as a computer and so on, has a Web browser for displaying the setting interface screen. It should be noted here that between the user terminal 4 of the end user and the setting server 1, communication is performed via a public network, such as the Internet and so on, or a network of the communication service provider.

<<Interface Screen Output>>

Next, interface screen output in this embodiment will be described. In order to perform the interface screen output, the user terminal 4 is provided with an ordinary Web browser (Web page browsing application software). The setting interface screen is displayed on display means, such as a display and so on, of the user terminal 4 via the Web browser, whereby a setting of various communication parameters can be performed with the setting interface screen in this embodiment.

Figure 3:
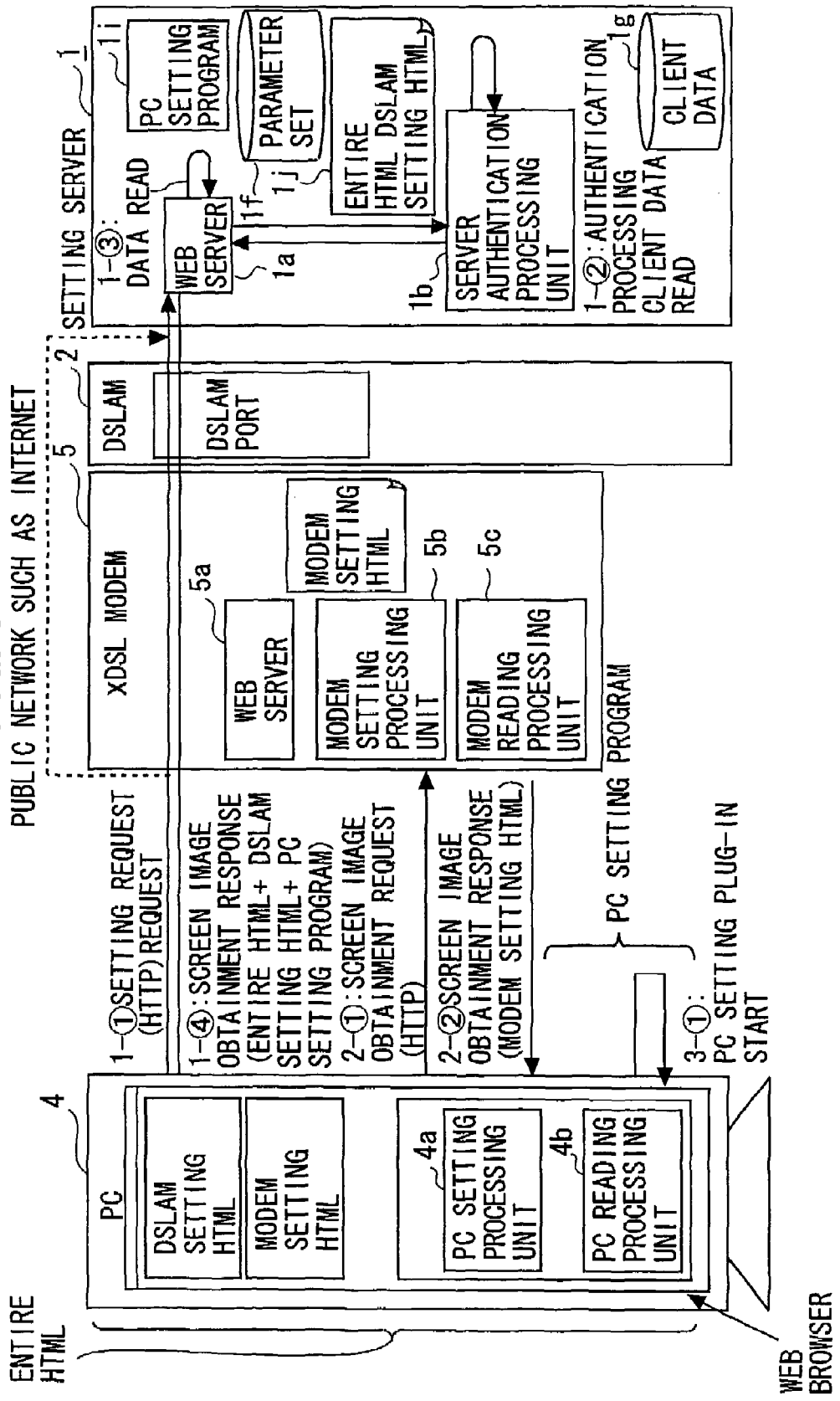
FIG. 3 is a flowchart showing a setting interface screen output processing in this system.

FIG. 3 is a flowchart illustrating starting processing for outputting the interface screen to the user terminal 4 in this system. In this system, at the time of outputting the setting interface screen, the user terminal 4 carries out the following procedure.

First, the user terminal 4 executes a setting interface screen acquisition request, in order to display the setting interface screen, to the Web server 1a comprised in the setting server 1 that outputs the setting interface screen (1-<1> in FIG. 3). The setting server 1, which accepting the setting interface screen obtainment request, performs authentication of the user terminal 4 by the server authentication processing unit 1b. When the authentication of the user terminal 4 has ended in success, the setting server 1 obtains client data corresponding to the user terminal 4 (1-<2> in FIG. 3). The setting server 1 reads entire HTML data constituting the whole of the setting interface screen, DSLAM HTML data for a setting of the DSLAM 2, and data for a setting of the user terminal (1-<3> in FIG. 3). The setting server 1 transmits these data to the user terminal 4.

In addition to the setting of the DSLAM 2, it is also possible to make a setting of the xDSL modem 5 in this system. The setting interface screen of the xDSL modem 5 is outputted through the following procedure. First, the user terminal 4 executes a setting interface screen obtainment request to the Web server 5a of the xDSL modem 5 (2-<1> in FIG. 3). The Web server 5a of the xDSL modem 5 reads the modem setting HTML and transmits to the user terminal 4 (2-<2> in FIG. 3). The user of the user terminal 4 receives the xDSL modem setting interface screen outputted to the user terminal 4. Then, the setting server 1 accepts an input of a setting of the xDSL 5 from the setting interface screen.

Next, communication parameters setting processing of the user terminal 4 in this system will be described. When the setting interface screen is displayed at the user terminal 4, a PC setting program for a setting of the user terminal 4 is started at the user terminal 4 (3-<1> in FIG. 3). As a result of the start of the PC setting program, it becomes possible to perform a setting of communication parameters of the user terminal 4 from the setting interface screen in this system.

Next, the setting interface screen in this system will be described.

Figure 4:
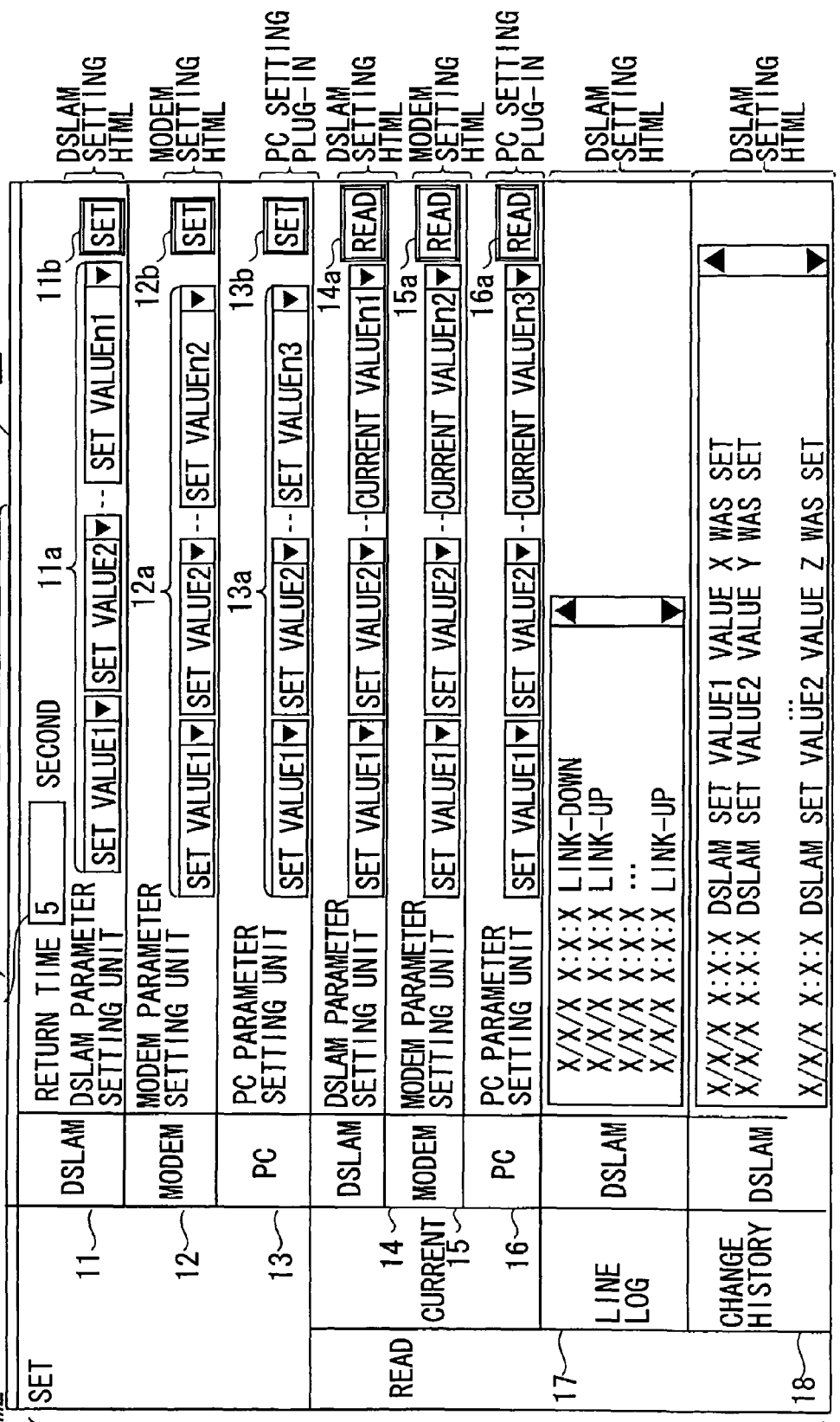
FIG. 4 shows an example of a setting interface screen in this system.

FIG. 4 shows an example of the setting interface screen in this system. In FIG. 4, the setting interface screen is indicated with reference numeral 10. The setting interface screen 10 includes set value input fields 11a, 12a, and 13a. Also, the setting interface screen 10 includes set buttons 11b, 12b, and 13b. Further, the setting interface screen 10 includes a return time setting field 11c. Still further, the setting interface screen 10 includes set value display areas 14, 15, and 16. Also, the setting interface screen 10 includes read buttons 14a, 15a, and 16a. Also, the setting interface screen 10 includes a line log display area 17 and a change history display area 18. With the setting interface screen 10, it becomes possible for the end user to set and read communication parameters in this system.

Next, each of the units of the setting interface screen 10 will be described. In the setting interface screen 10, the set value input fields 11a, 12a, and 13a that accept an input of set values of various communication parameters of the DSLAM 2, the xDSL modem 5, and the user terminal 4 (PC) are provided. In the set value input fields 11a, communication parameters to be set to the DSLAM 2 are designated. After the input of the communication parameters, the set button 11b is clicked on, thereby setting the communication parameters. In such a manner, the communication parameters of the xDSL modem 5 and the user terminal 4 are set by designating communication parameters to be set in the set value input fields 12a and 13a and clicking on the set buttons 12b and 13b.

The return time setting field 11c accepts a setting of a time for return to an original setting of the communication parameters when a line, for which the communication parameters setting is being performed, is disconnected.

Also, in the set value display areas 14, 15, and 16 of the setting interface screen 10, it is possible to read and display current set values of the communication parameters of the DSLAM 2, the xDSL modem 5, and the user terminal 4. To be specific, when the read buttons 14a, 15a, and 16a are clicked on from the user terminal 4 (read instruction is inputted therefrom), the current set values of the communication parameters of the DSLAM 2, the xDSL modem 5, and the user terminal 4 are read and are displayed in the set value display areas 14, 15, and 16. It should be noted here that processing for reading and displaying the set communication parameters will be described in detail later.

Also, in the setting interface screen 10, it is possible to read and display the line history (line log) and setting change history of the DSLAM 2. It should be noted here that in this system, the line log refers to a communication line state, such as the dates and times of line disconnection, at the user terminal 4 that performs the communication parameters setting. An example of line log displaying in the setting interface screen 10 is shown in the line log display area 17 in FIG. 4. Also, in this system, displaying of the setting change history means displaying of set values and change dates and times of the communication parameters of the DSLAM 2, the user terminal 4, and the xDSL modem 5 relating to the line that the user terminal 4 performing the communication parameters setting uses. An example of the change history displaying in the setting interface screen 10 is shown in the change history display area 18 in FIG. 4.

Also, in this embodiment, in order to circumvent complexity of the communication parameters determination, a construction may be used in which each of patterns of the plural of set values of the communication parameters are created as a set and it is possible to set the communication parameters through selection from among the parameter sets.

FIG. 5 shows an example of a communication parameter set value pattern table. In the pattern table, various set values concerning each of the DSLAM 2, the user terminal 4, and the xDSL modem are combined with each other and are stored as parameter sets. With the parameter sets, it becomes possible to simplify the communication parameters setting. The parameter sets are identified with character strings referred to as the batch setting identifiers. It is sufficient for the user to set one of the batch setting identifiers instead of setting the parameters separately. It should be noted here that in this system, the parameter sets are also referred to as the setting patterns. In this case, when accepting a setting interface screen obtainment request from the user terminal 4, the setting server 1 searches the parameter set database 1f where the parameter sets are stored using a batch setting identifier as a key. Then, the setting server 1 reads parameter set information (setting pattern) corresponding to the batch setting identifier and transmits the information to the user terminal 4.

As examples of the set values to be set with the parameter sets described above, it is possible to cite various set values such as a "noise margin" that is a setting parameter of the DSLAM 2, a "ATU-C transmission system" that is a setting parameter of the xDSL modem 5, and a "TCP/IP window size" that is a setting parameter of the user terminal 4. By creating sets of those set values, it becomes possible to provide setting patterns, such as "speed (high) quality (low)", "speed (middle) quality (middle)", and "speed (low) quality (high)" and so on, which are parameter sets where the communication speed and the communication quality are combined with each other.

Figure 6:
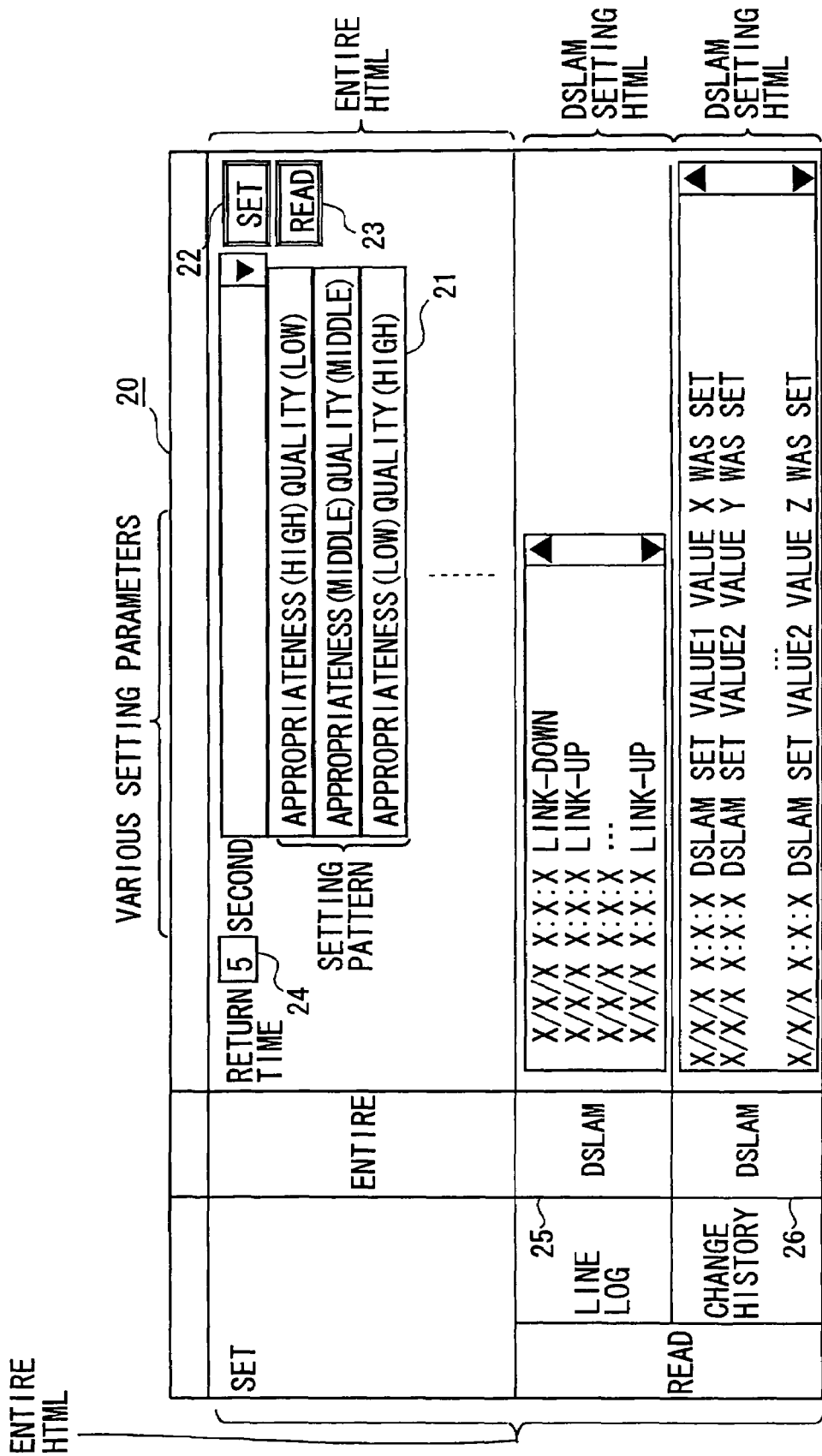
FIG. 6 shows an example where setting items on the setting interface screen in this system are simplified.

FIG. 6 shows an example of a communication parameters setting interface screen using the parameter sets where the setting patterns are combined with each other. In FIG. 6, the setting interface screen is indicated with reference numeral 20. In the setting interface screen 20, a setting pattern selection field 21, a set button 22, a read button 23, a return time setting field 24, a line log display area 25, and a change history display area 26 are provided. The setting pattern selection field 21 causes setting patterns that are sets of set values of the communication parameters to be displayed on a user terminal 4 side. Also, the setting pattern selection field 21 accepts a setting pattern selection made at the user terminal 4. The set button 22 accepts an instruction to carry out a setting based on the communication parameters accepted by the setting pattern selection field 21. The read button 23 accepts an instruction to read when reading communication parameter set values from the DSLAM 2, the xDSL modem 5, and the user terminal 4. The return time setting field 24 accepts a setting of a time for return to an original communication parameter setting when a line, for which the communication parameters setting is being performed, is disconnected. The line log display area 25 and the change history display area 26 display contents that are the same as the display contents of the line log display area 17 and the change history display area 18 of the setting interface screen 10 shown in FIG. 4 described above. With the communication parameter setting patterns, it becomes possible for the end user collectively to change the settings of the DSLAM 2, the xDSL modem 5, and the user terminal 4 merely by selecting a setting pattern "speed (high) quality (low)" from the setting interface screen 20 and clicking on the set button 22 without individual setting of each of the setting parameters when the end user wants to increase the communication speed while lowering the quality, for instance.

With the parameter sets, in this system, at the time of a line parameter change, it becomes unnecessary for the end user to determine the complicated plural communication parameters, that is, it becomes sufficient that he/she makes a simple name selection.

<<Communication Parameter Read and Display Processing>>

Next, the various communication parameters read and display processing performed in this system will be described.

The setting server 1 accepts, from the user terminal 4, instructions (clicking) from the read buttons 15*a*, 16*a*, and 17*a*, which respectively correspond to the DSLAM 2, the xDSL modem 5, and the user terminal 4, of the setting interface screen 10 shown in FIG. 4. On accepting the instructions, the setting server 1 reads each communication parameter. Then, the setting server 1 transfers each communication parameter to the user terminal 4. The user terminal 4, accepting the communication parameter, displays the parameter on the setting interface screen 10.

This communication parameter read and display processing will be described using the flowchart shown in FIG. 7.

Figure 7:
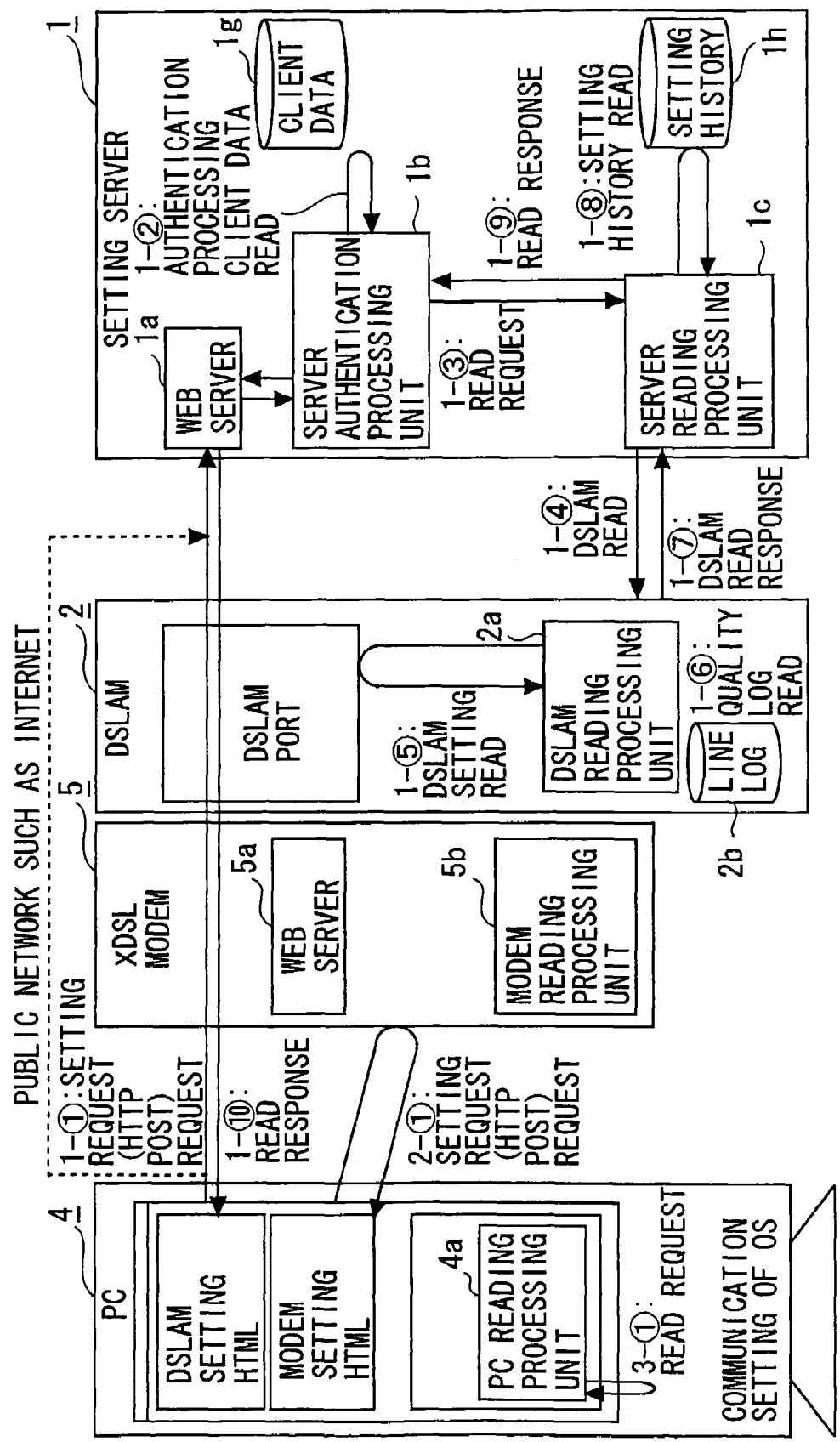
FIG. 7 is a flowchart showing communication parameter read processing in this system.

When the DSLAM read button 15*a* of the setting interface screen 10 is clicked on, the user terminal 4 executes a request to read the communication parameters of the DSLAM 2 to the server authentication processing unit 1*b* of the setting server 1 via the Web server (1-<1> in FIG. 7). The setting server 1, accepting the communication parameter read request, performs authentication and confirmation of the user terminal 4 in the server authentication processing unit 1*b*. When the authentication of the user terminal 4 has ended in success, the setting server 1 reads client data corresponding to the user terminal 4 (1-<2> in FIG. 7).

According to the instructions from the setting server 1, when the client data reading is completed, the server authentication processing unit 1*b* executes a request to read communication parameters corresponding to the client data to the server reading processing unit 1*d* (1-<3> in FIG. 7). On accepting the communication parameter read request, the server reading processing unit 1*d* executes a DSLAM read request to the DSLAM reading processing unit 2*b* in the DSLAM 2 (1-<4> in FIG. 7).

The DSLAM reading processing unit 2*b* performs DSLAM setting read processing with respect to the DSLAM port (1-<5> in FIG. 7). Also, the DSLAM reading processing unit 2*b* reads the line log from the line log database (1-<6> in FIG. 7). Through the DSLAM setting read processing and the line log read processing, the DSLAM reading processing unit 2*b* obtains information concerning the communication parameters and the line log corresponding to the user terminal 4 that executed the request. In order to transmit the information of the communication parameters and the line log to the setting server 1 side, the DSLAM reading processing unit 2*b* executes a DSLAM read response to the server reading processing unit 1*c* (1-<7> in FIG. 7).

The server reading processing unit 1*c*, accepting the read response, reads communication parameters setting history information from the setting history database 1*h* corresponding to the user terminal 4 executed the request (1-<8> in FIG. 7). The communication parameters setting history information is transmitted to the server authentication processing unit 1*b* together with the read information acquired at the DSLAM 2 (1-<9> in FIG. 7). The communication parameters, the line log, and the communication parameters setting history information transmitted to the server authentication processing unit 1*b* are transmitted to the user terminal 4 (1-<10> in FIG. 7). By carrying out the processing described above, in this system, it becomes possible to display the current communication parameter state corresponding to a contract held by the end user in the screen. In addition, in this system, the communication parameter setting history information, such as the line log or setting changes, is also displayed in the setting interface screen, so it becomes possible for the user to perform a setting operation while referring to the communication parameters.

In addition, in this system, it is also possible to execute a request to read the communication parameters of the xDSL modem 5 and the user terminal 4 from the setting interface screen 10 of the user terminal 4. Next, processing for reading the communication parameters of the xDSL modem 5 and the user terminal 4 will be described.

When executing a communication parameter read request with respect to the xDSL modem 5, modem parameter setting contents are read by the modem reading processing unit 5*b* in the xDSL modem 5 that accepted the request. The xDSL modem 5 responses the communication parameters corresponding to the read request to the user terminal 4 (2-<1> in FIG. 7). Also, when executing a request to read the communication parameters of the user terminal 4, the read request is performed to the communication parameter reading processing unit 4*a* in the user terminal 4 (3-<1> in FIG. 7). On accepting the read request, the communication parameter reading processing unit 4*a* requests to obtain OS (Operating System) communication parameters of the user terminal 4. The user terminal 4 displays the obtained communication parameters on a display apparatus (not shown). As a result, it becomes possible for the user to refer to current communication parameters of the xDSL modem 5 and the user terminal 4.

<<Communication Parameters Setting>>

Figure 8:
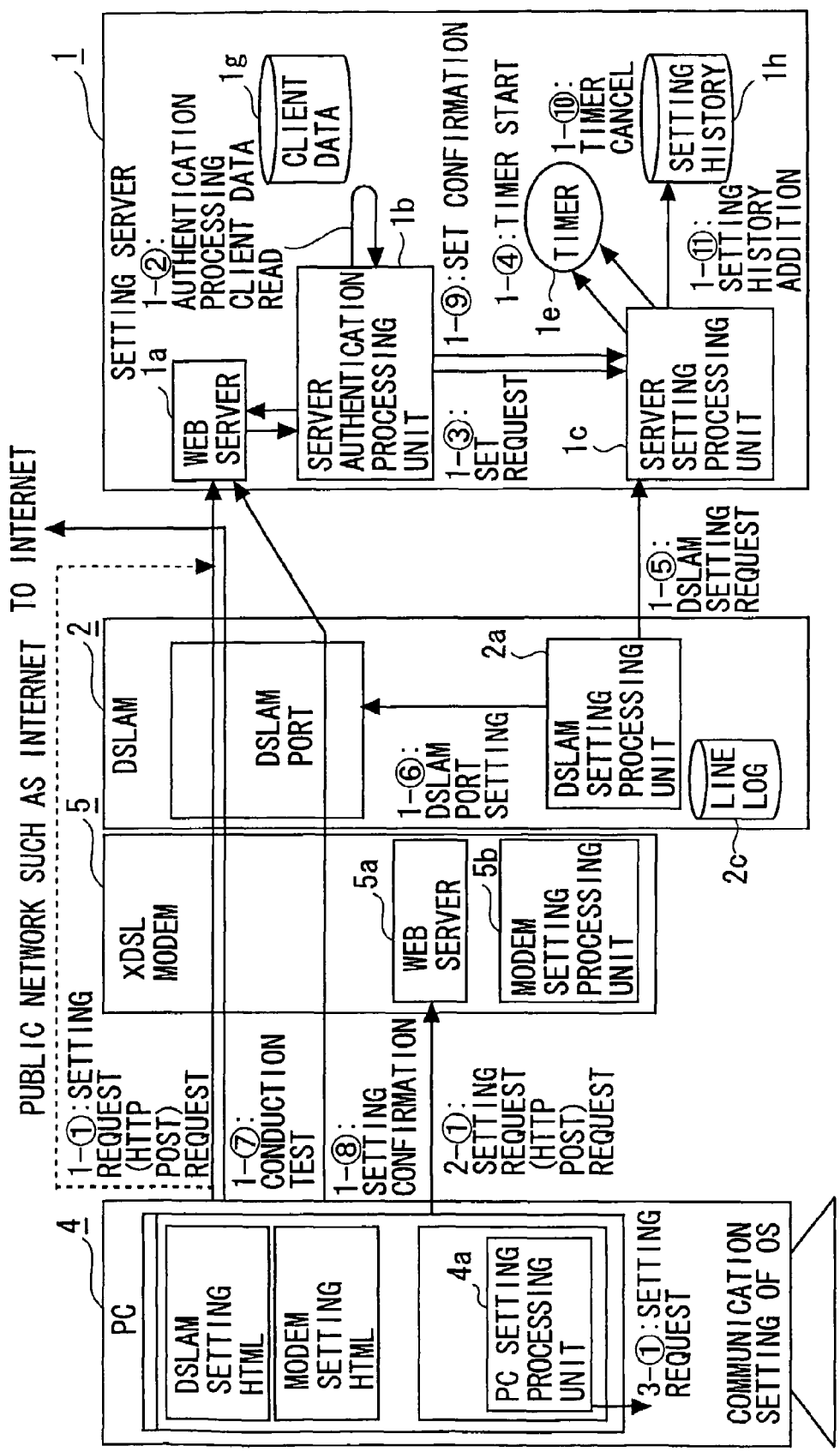
FIG. 8 is a flowchart showing communication parameters setting processing in this system.

FIG. 8 is a flowchart illustrating a procedure of communication parameters setting processing performed in this system. Hereinafter, the communication parameters setting processing will be described with reference to FIG. 8. First, the user terminal 4 accepts a communication parameters setting request from the setting interface screen 10. The user terminal 4 transmits the communication parameters setting request to the setting server 1 (1-<1> in FIG. 8). At the setting server 1, the communication parameters setting request is passed to the server authentication processing unit 1*b* via the Web server unit 1*a*.

The server authentication processing unit 1*b*, accepting the setting request, carries out authentication of the user terminal 4. When the authentication of the user terminal 4 has ended in success, the server authentication processing unit 1*b* reads client data corresponding to the user terminal 4 executed the request from the client database 1*d* (1-<2> in FIG. 8). The server authentication processing unit 1*b*, reading the client data, executes a communication parameters setting request corresponding to the client data to the server setting processing unit 1*c* (1-<3> in FIG. 8). The server setting processing unit 1*c*, accepting the setting request, starts the timer 1*e* that performs return time time-out management for setting confirmation (1-<4> in FIG. 8). It should be noted here that a timer value to be set at the time of the timer start can be set on the user terminal 4 side. The timer value setting is performed from the setting interface screen displayed on the user terminal 4 side. Also, it is assumed that the timer value is transmitted to the setting server 1 at the time of the setting request from the user terminal 4. An example of the return time setting field of the setting interface screen 10 is indicated with reference numeral 11*c* in FIG. 4. Also, an example of the return time setting field of the setting interface screen 20 is indicated with reference numeral 24 in FIG. 6.

After the start of the timer 1*e*, the server setting processing unit 1*c* executes a DSLAM setting request to the DSLAM setting processing unit 2*a* in the DSLAM 2 based on communication parameters (1-<5> in FIG. 8).

The DSLAM setting processing unit 2*a* sets communication parameters inputted by the user to the DSLAM port (1-<6> in FIG. 8). It should be noted here that the setting parameters of the DSLAM 2, the xDSL modem 5, and the user terminal 4 as shown in FIG. 5 described above is created as sets in addition, and is provided setting patterns, thereby, it is also possible to perform a batch setting of the DSLAM 2, the xDSL modem 5, and the user terminal 4.

After the setting processing, the user confirms whether the set values are effective using application software or the like that he/she usually uses (1-<7> in FIG. 8). Following this, when no problem is found in processing, such as information distribution, with the executed application software, setting confirmation is performed with respect to the setting server from the setting interface screen (1-<8> in FIG. 8).

The setting confirmation is included a method described below, for instance. After the setting processing, the user terminal 4 urges the user to confirm the setting by displaying a popup screen or the like. After the user performs the setting confirmation from the user terminal 4, a setting confirmation is requested to the server setting processing unit 1*c* via the server authentication processing unit 1*b* in the setting server 1 (1-<9> in FIG. 8). The server setting processing unit 1*c* cancels (stops) the timer started at the time of the setting request (1-<10> in FIG. 8) and stores setting history information in the setting history database (1-<11> in FIG. 8).

In addition, in this system, it is also possible to change the settings of the xDSL modem 5 and the user terminal 4 from the setting interface screen 10 in accordance with the setting of the communication parameters of the DSLAM 2. The user executes a setting request to the xDSL modem 10 from the setting interface screen 10 of the user terminal 4 (2-<1> in FIG. 8). The xDSL modem 5, accepting the setting request, transmits the setting request to the modem setting processing unit 5*b* via the Web server unit 5*a*. The modem setting processing unit 5*b* performs a setting of the xDSL modem 5 in accordance with the setting request. Also, the user executes a setting request to the user terminal 4 from the setting interface screen 10 of the user terminal 4 (3-<1> in FIG. 8). On accepting the setting request, at the user terminal 4, the user terminal setting processing unit 4*a* performs a setting.

<<Communication Parameter Restoration Processing>>

Figure 9:
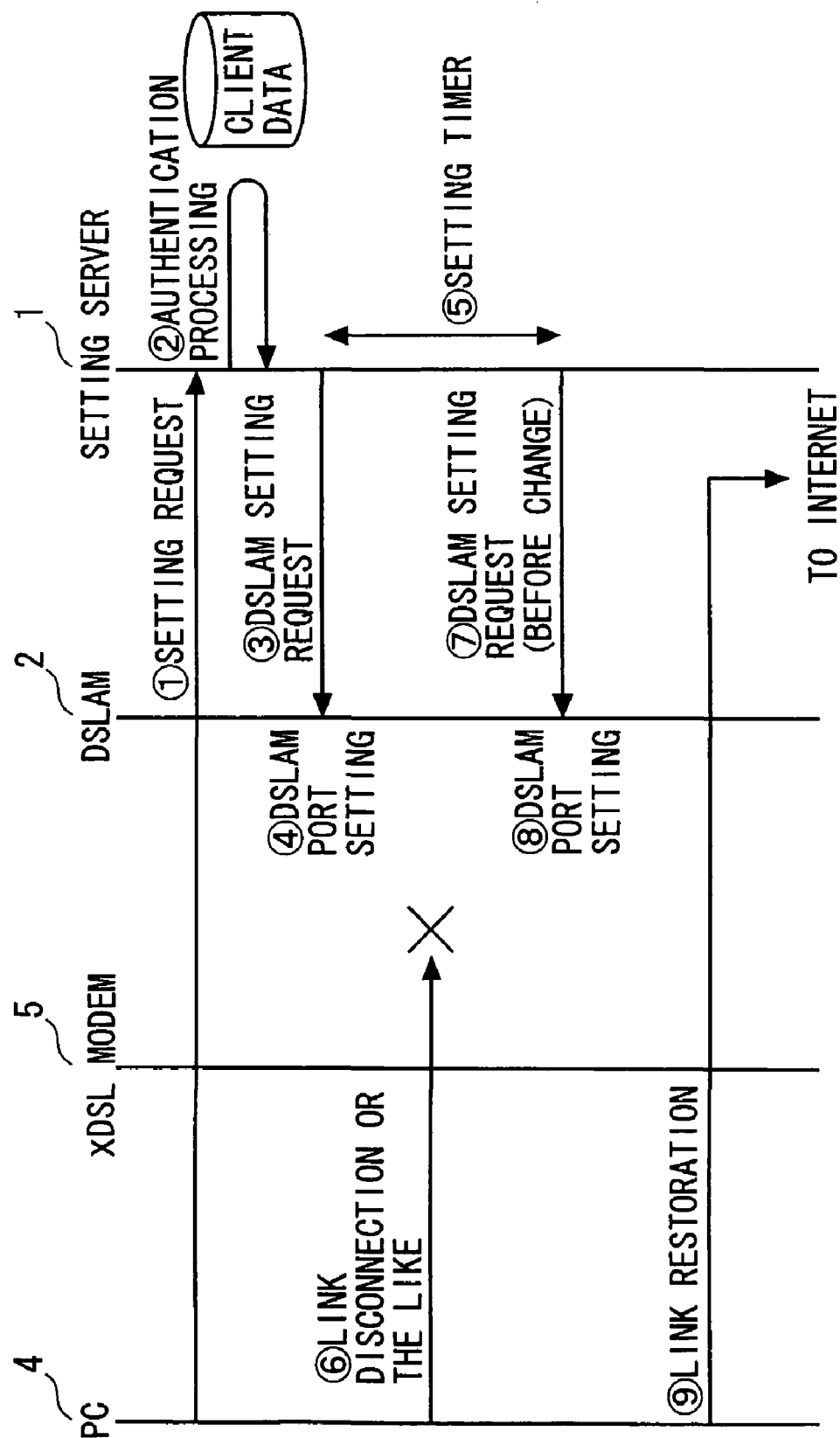
FIG. 9 is a flowchart showing communication parameter restoration processing in this system.
Figure 10:
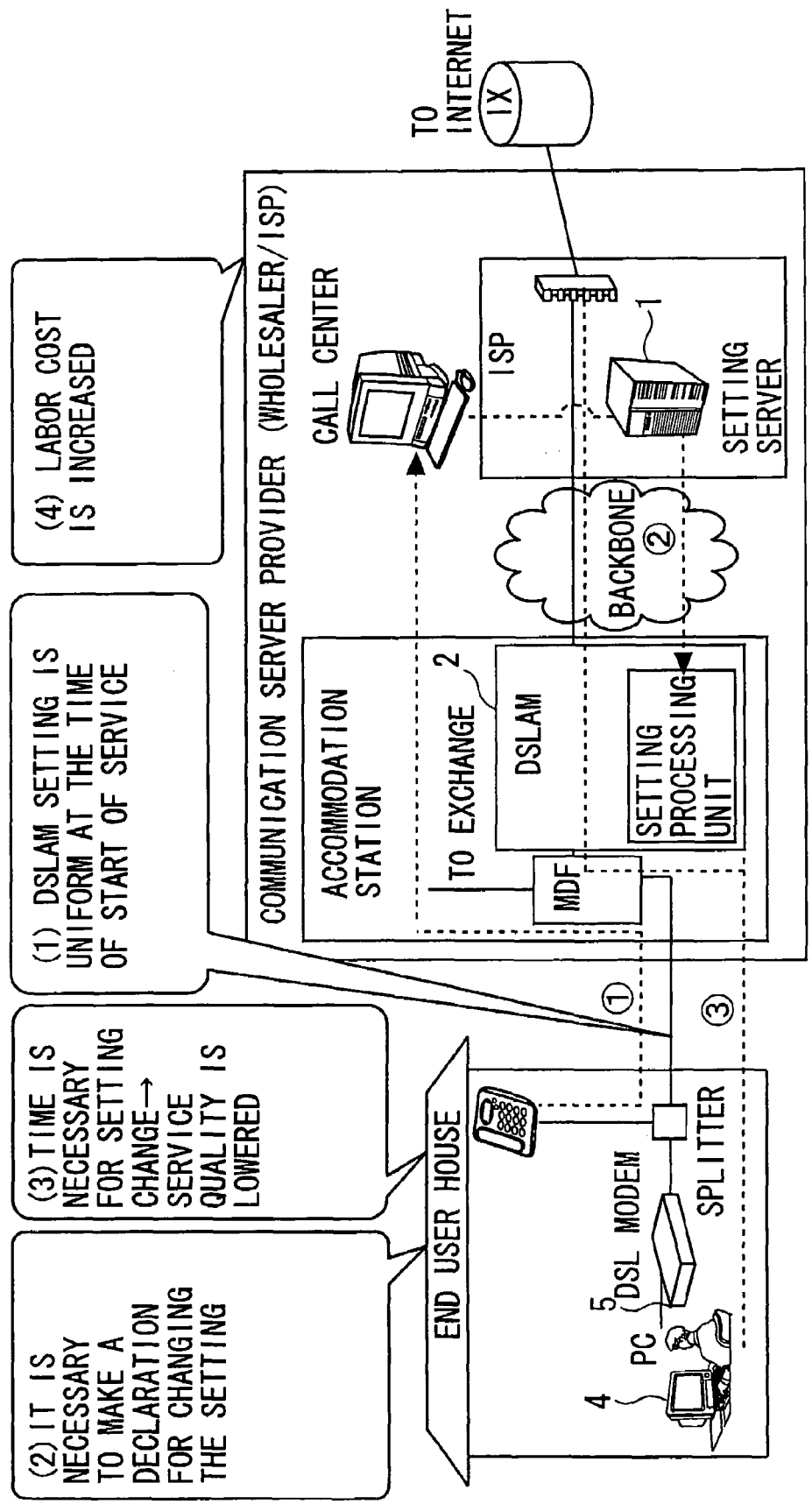
FIG. 10 shows problems of a conventional communication parameters setting in a communication service.

FIG. 9 is a sequence diagram illustrating communication parameter restoration processing performed in this system.

With the communication parameter restoration processing, in this system, it becomes possible to restore a setting before a change when communication parameters set by the user are erroneous at the time of setting communication parameters and communication becomes impossible or when the user does not perform setting confirmation after setting processing within the timer monitoring time period.

The communication parameter restoration processing will be described with reference to the sequence diagram in FIG. 9. The server setting processing unit 1*c* in the setting server 1 accepts a setting request from the user terminal 4 (<1> in FIG. 9). Based on the accepted setting request, the server authentication processing unit 1*b* performs authentication of the user terminal 4 (<2> in FIG. 9). After the authentication processing of the user terminal 4, the server setting processing unit 1*c* executes a setting request to the DSLAM 2 (<3> in FIG. 9). When doing so, at the setting server 1, the time-out monitoring by the timer 1*e* is started (<5> in FIG. 9).

At the DSLAM 2 that accepted the setting request from the setting processing unit 1*c*, the DSLAM setting processing unit 2*a* performs a requested setting (<4> in FIG. 9). However, when the performed setting is an erroneous setting, link disconnection of the network or the like occurs, and therefore no setting confirmation response is accepted within the monitoring time period of the timer 1*e* (<6> in FIG. 9), after the timer monitoring time period has expired, communication parameters that allow communication are set to the DSLAM 2 from the setting server 1. As setting the communication parameters that allow communication, in this system, a setting request is executed so that setting contents before the change are set again, for instance (<7> in FIG. 9). As a result, the port setting at the DSLAM 2 is returned to the setting before the change (<8> in FIG. 9). By returning the communication parameters setting to the setting before the change, restoration of a link is performed in this system (<9> in FIG. 9). Accordingly, the end user becomes capable of normally performing an screen operation accompanying communication after the monitoring time period set of the timer 1*e* has expired.

In this system, the set communication parameters, at the setting server 1 after the prescribed time period has elapsed, are automatically returned to a state before the change at the time of changing communication parameters of a line that the end user uses under a contract, thereby, it is possible to avoid a situation where the end user falls into an incommunicable state when communication parameters set by the end user are erroneous.

Also, along with the setting of the DSLAM 2 performed via the setting server 1, the user terminal 4 changes the communication parameters setting of the user terminal 4 and the communication parameters setting of the modem 5 that connects to the user terminal 4. Through this processing, in this system, when the communication parameters of the line that the end user uses under a contract are changed, the settings of the modem 5 and the user terminal 4 provided in an end user house are also changed. Accordingly, in this system, the setting of the DSLAM 2 and the settings of the modem 5 and the user terminal 4 provided in the house are performed in a batch manner. As a result, it becomes possible to obtain an optimum setting for every device relating to communication.

Other Embodiments

The communication parameters setting method, setting program, and setting server in a communication service according to the present invention are not limited only to the embodiment described above and it is of course possible to make various changes without departing from the gist of the present invention.

In the embodiment, the communication parameters setting method according to the present invention is applied to the xDSL communication service, although this communication parameters setting method may be applied to other communication service. As an example of the other communication service, it is possible to cite Internet connection service that is provided at a facility, such as a shop, an airport, or a station, and uses a wireless LAN (Local Area Network).

Also, the present invention may be applied to FTTH (Fiber To The Home), for instance.

Further, in this system, the current line state, line log, and setting change history of each user terminal 4 may be held in the setting server 1.

INDUSTRIAL APPLICABILITY

According to a communication parameters setting method, in a communication service of the present invention, a line setting technique in a communication service is provided with which it is possible for an end user to obtain an optimum line state at all times without placing a load on a communication service provider. Thereby, the present invention is applicable to an information communication industry where communication devices and information devices are used or a manufacturing industry where the communication devices and the information devices are manufactured.

What is claimed is:

1. A communication parameter setting method for supporting a communication parameter setting of a user in a communication service, a setting server connected to a network for use in the communication service comprising:
    outputting data of an interface screen for respectively inputting a first communication parameter, a second communication parameter and a third communication parameter to a user terminal provided on a user side, the first communication parameter to be set in the user terminal, the second communication parameter to be set in a user-side communication apparatus having the user terminal connected to a network on a service provider side providing the communication service, the third communication parameter to be individually set for every user who uses a line of the communication service in a provider-side communication apparatus on the network on the service provider side;
    receiving at least one parameter of the first communication parameter, the second communication parameter and the third communication parameter which are entered through the interface screen;
    connecting to at least one communication apparatus of the user terminal, the user-side communication apparatus and the provider-side communication apparatus corresponding to the at least one parameter; and
    setting the at least one received parameter to the at least one communication apparatus.

2. The communication parameter setting method according to claim 1, wherein
    the connecting to the at least one communication apparatus includes connecting to a control apparatus controlling the provider-side communication apparatus and
    the setting the at least one parameter includes setting the third communication parameter to the provider-side communication apparatus via the control apparatus.

3. The communication parameter setting method according to claim 1, further comprising:
    accepting a connection request with respect to the control apparatus from the user terminal; and
    authenticating the user terminal upon accepting the connection request.

4. The communication parameter setting method according to claim 3, further comprising outputting data of an interface screen for displaying a setting change history of communication parameters set in the past by the user.

5. The communication parameter setting method according to claim 4, wherein further comprising:
    outputting an interface screen for selecting any one of a plurality of parameter sets each being a combination of set values of the first communication parameter, the second communication parameter and the third communication parameter; and
    collectively setting, in the user terminal, the user-side communication apparatus and the provider-side communication apparatus, the set values included in the selected parameter set.

6. The communication parameter setting method according to claim 5, further comprising:
    starting a timer for measuring time upon the communication parameter of the provider-side communication apparatus being changed; and
    restoring the communication parameter to its state before the change if a setting confirmation response for confirming the communication parameter setting is not received from the user terminal within a predetermined measurement time period after starting the timer.

7. The communication parameter setting method according to claim 1, further comprising outputting data of an interface screen for displaying communication parameters which are currently set in the user terminal, the user-side communication apparatus and the provider-side communication apparatus.

8. The communication parameter setting method according to claim 1, further comprising outputting data of an interface screen for displaying communication log information at the time of providing the communication service with the use of communication parameters which are currently set in the user terminal, the user-side communication apparatus and the provider-side communication apparatus.

9. A communication parameter setting server to support a communication parameter setting of a user in a communication service and connected to a network for use in the communication service, the communication parameter setting server comprising:
    an interface screen output unit to output data of an interface screen for respectively inputting a first communication parameter, a second communication parameter and a third communication parameter to a user terminal provided on a user side, the first communication parameter to be set in the user terminal, the second communication parameter to be set in a user-side communication apparatus having the user terminal connected to a network on a service provider side providing the communication service, the third communication parameter to be individually set for every user who uses a line of the communication service in a provider-side communication apparatus on the network on the service provider side;
    a receiving unit to receive at least one parameter of the first communication parameter, the second communication parameter and the third communication parameter which are entered through the interface screen;
    a connection unit to connect to at least one communication apparatus of the user terminal, the user-side communication apparatus and the provider-side communication apparatus corresponding to the at least one parameter; and a setting unit to set the at least one received parameter to the at least one communication apparatus.

10. The communication parameter setting server according to claim 9, wherein the connection unit connects to a control apparatus controlling the provider-side communication apparatus; and the setting unit sets the third communication parameter to the provider-side communication apparatus via the control apparatus.

11. The communication parameter setting server according to claim 9, further comprising:

a request accepting unit to accept a connection request with respect to the control apparatus from the user terminal; and a authentication unit to authenticate the user terminal upon accepting the connection request.

12. The communication parameter setting server according to claim 11, wherein the interface screen output unit includes a setting change history of communication parameters set in the past by the user in the interface screen.

13. The communication parameter setting server according to claim 9, wherein the interface screen output unit includes communication parameters which are currently set in the user terminal, the user-side communication apparatus and the provider-side communication apparatus in the interface screen.

14. The communication parameter setting server according to claim 9, wherein the interface screen output unit includes communication log information at the time of providing the communication service with the use of communication parameters which are currently set in the user terminal, the user-side communication apparatus and the provider-side communication apparatus in the interface screen.

15. The communication parameter setting server according to claim 14, wherein the interface screen output unit includes, in the interface screen, an area for selecting any one of a plurality of parameter sets each being a combination of set values of the first communication parameter, the second communication parameter and the third communication parameter, and the setting unit collectively sets, in the user terminal, the user-side communication apparatus and the provider-side communication apparatus, the set values included in the selected parameter set.

16. The communication parameter setting server according to claim 15, further comprising:

a timer to measure time upon the communication parameter of the provider-side communication apparatus being changed; and a restoring unit to restore the communication parameter to its state before the change if a setting confirmation response for confirming the communication parameter setting is not received from the user terminal within a predetermined measurement time period after starting the timer.

17. A computer readable storage medium having a program stored therein for causing a computer, connected to a network for use in a communication service, to execute a communication parameter setting method for supporting a communication parameter setting of a user in the communication service, the communication parameter setting method comprising:

outputting data of an interface screen for respectively inputting a first communication parameter, a second communication parameter and a third communication parameter to a user terminal provided on a user side, the first communication parameter to be set in the user terminal, the second communication parameter to be set in a user-side communication apparatus having the user terminal connected to a network on a service provider side providing the communication service, the third communication parameter to be individually set for every user who uses a line of the communication service in a provider-side communication apparatus on the network on the service provider side;

receiving at least one parameter of the first communication parameter, the second communication parameter and the third communication parameter which are entered through the interface screen;

connecting to at least one communication apparatus of the user terminal, the user-side communication apparatus and the provider-side communication apparatus corresponding to the at least one parameter; and setting the at least one received parameter to the at least one communication apparatus.

18. The computer readable medium having the program stored therein for causing the computer to execute the communication parameter setting method according to claim 17, wherein the connecting to the at least one communication apparatus includes connecting to a control apparatus controlling the provider-side communication apparatus and the setting the at least one parameter includes setting the third communication parameter to the provider-side communication apparatus via the control apparatus.

19. The computer readable medium having the program stored therein for causing the computer to execute the communication parameter setting method according to claim 17, further comprising:

accepting a connection request with respect to the control apparatus from the user terminal; and authenticating the user terminal upon accepting the connection request.

20. The computer readable medium having the program stored therein for causing the computer to execute the communication parameter setting method according to claim 19, further comprising outputting data of an interface screen for displaying a setting change history of communication parameters set in the past by the user.

21. The computer readable medium having the program stored therein for causing the computer to execute the communication parameter setting method according to claim 20, further comprising:

outputting an interface screen for selecting any one of a plurality of parameter sets each being a combination of set values of the first communication parameter, the second communication parameter and the third communication parameter; and collectively setting, in the user terminal, the user-side communication apparatus and the provider-side communication apparatus, the set values included in the selected parameter set.

22. The computer readable medium having the program stored therein for causing the computer to execute the communication parameter setting method according to claim 21, further comprising:

starting a timer for measuring time upon the communication parameter of the provider-side communication apparatus being changed; and restoring the communication parameter to its state before the change if a setting confirmation response for confirming the communication parameter setting is not received from the user terminal within a predetermined measurement time period after starting the timer.

23. The computer readable medium having the program stored therein for causing the computer to execute the communication parameter setting method according to claim 17, further comprising outputting data of an interface screen for displaying communication parameters which are currently set in the user terminal, the user-side communication apparatus and the provider-side communication apparatus.

24. The computer readable medium having the program stored therein for causing the computer to execute the communication parameter setting method according to claim 17, further comprising outputting data of an interface screen for displaying communication log information at the time of providing the communication service with the use of communication parameters which are currently set in the user terminal, the user-side communication apparatus and the provider-side communication apparatus.

* * * * *